2,835,580
Patented May 20, 1958

2,835,580

PHOTOGRAPHIC EMULSION WITH VINYL ALCOHOL - N - ALLYLCYANOACETAMIDE COPOLYMER CONTINUOUS PHASE

Leopold Godowsky, Westport, Conn., and Arnold Weissberger and William F. Knechel, Rochester, N. Y., assignors to Eastman Kodak Company, Rochester, N. Y., a corporation of New Jersey No Drawing. Application November 10, 1955
Serial No. 546,262

7 Claims. (Cl. 96—98)

This invention relates to color photography and particularly to packet photographic emulsions.

As referred to herein a "packet" emulsion is one in which discrete particles or packets of a protein material such as gelatin or gelatin derivative (as hereinafter described) contain silver halide emulsion and a dyeing material such as a water-soluble dye or color coupler, or oil soluble dyes or couplers or vat dyes and are dispersed in a continuous phase or matrix of a high polymer in a suitable solvent, usually a water-soluble, water-permeable polyvinyl resin or a derivative of such resin. Two or more packet emulsions may be mixed or coated in a single matrix or continuous phase to form a mixed packet emulsion.

Packet emulsions have been made in various ways such as by the use of synthetic resins to form and stabilize the packets which are incorporated in a gelatin matrix. A process of this type is described in Godowsky U. S. Patent 2,698,794. Packet emulsions have also been made using natural materials such as algin (Godowsky U. S. Patent 2,548,526) and zein (Lowe U. S. Patent 2,563,791) to form and stabilize the packets or by using hardened particles of gelatin containing silver halide and color-forming compound (Baines, Teal and Davey U. S. Patent 2,618,553). In each case, the continuous phase or matrix is gelatin or similar protein material.

Polyvinyl resins have been used as the continuous phase for emulsions containing dispersed particles of gelatin having dye or color-forming compounds associated therewith (British Patent 540,368). These are not "packets" as defined herein since the particles of gelatin and dye or color former do not contain the silver halide.

Wilson and Knechel U. S. application Serial No. 525,345, filed July 29, 1955, describes a packet photographic emulsion which is made by adding an emulsion of silver halide in a protein material such as a gelatin derivative, above its isoelectric point, to a solution of a water-soluble or partially water-insoluble, water permeable polyvinyl resin, adjusting the pH of the mixture approximately to the isoelectric point of the protein material, thereby forming packets or particles of protein material in the resin and mixing a dye or color former with the emulsion to form packets containing protein material, silver halide and dye or color former.

We have now found that by modifying the Wilson and Knechel process somewhat, particularly by using a derivative of polyvinyl alcohol as the continuous phase, improved results can be obtained. We propose to use a copolymer of vinyl alcohol and N-allylcyanoacetamide as the continuous phase of the packet emulsion. This copolymer can be readily hardened in a formaldehyde solution to permit processing the coating by the silver dye bleach process with a strong solution of thiourea. Ordinary polyvinyl alcohol tends to swell and dissolve in strong solutions of thiourea.

Our method in its broader aspects comprises mixing a gelatino-silver halide emulsion and a bleachable azo dye or color former, together with a solution of the ammonium salt of a copolymer of styrene and maleic anhydride, with the copolymer of vinyl alcohol and N-allylcyanoacetamide and forming packets by adding calcium acetate to the mixture of these components. A mixed packet coating may be made by forming two or more packet emulsions in this way and mixing them.

More specifically, our method comprises making a single packet or mixed packet emulsion which can be used in the silver dye bleach process of color photography or in a color development process, depending upon whether an azo dye or a color former is employed.

For the silver dye bleach process, to a water solution of the copolymer of vinyl alcohol and N-allylcyanoacetamide there is added a solution in water of a soluble salt of an azo dye suitable for the dye bleach processes. To this mixture there is added an aqueous solution of the ammonium salt of styrene-maleic anhydride copolymer and a solution of a dispersing agent (Duponol C).

A gelatino-silver halide emulsion is made and is optically sensitized to red, green or blue light, or is allowed to retain its natural blue sensitivity. To this emulsion there is added a solution of gelatin derivative (as hereinafter defined), and the mixture added slowly to the resin and dye solution just described. Packets are formed by adding a solution of calcium acetate, with stirring.

For the color development process, a water solution is made of the vinyl alcohol-N-allylcyanoacetamide copolymer and the dispersing agent added to it.

A dispersion of a color-forming compound is made in a gelatino-silver halide emulsion, ordinary bone gelatin being used in this case, the emulsion being suitably optically sensitized as before.

The emulsion-coupler dispersion is added and blended with the resin solution, and an aqueous solution of the ammonium salt of styrene-maleic anhydride copolymer added and the mixture stirred. Packets are formed by adding a solution of calcium acetate, with stirring, as before.

The gelatin derivative used according to our invention is a compound such as those obtained by treatment of gelatin with:

Aromatic sulfonyl chlorides and carboxylic acid chlorides, e. g., m-Carboxybenzene sulfonyl chloride
    4-chlorosulfonyl phthalic acid
    p-Chlorosulfonyl phenoxyacetic acid
    3,5-dicarbomethoxy phenoxy acetyl chloride
    $\delta$ - (3,5 - dicarbomethoxy phenoxycarbamyl) - valeryl chloride
    3-nitrobenzoyl chloride Carbocyclic or carboxylic acid derivatives of gelatin, e. g., those which are obtained by treating gelatin with:

Phthalic anhydride
    Benzoic anhydride
    Succinic anhydride
    Adipic anhydride
    Maleic anhydride Cyanoethylated gelatin
Phenylureido gelatin The aromatic sulfonyl and carboxylic acid chloride derivatives and the carboxylic acid derivatives of gelatin are described in Yutzy and Frame U. S. Patent 2,614,928. Cyanoethylated gelatin is described in Gates and Lowe British Patent 648,926.

The copolymer of vinyl alcohol and N-allylcyanoacetamide is made by copolymerizing vinyl acetate and N-allylcyanoacetamide followed by alcoholic acid hydrolysis of the vinyl ester portion of the copolymer. The amount of N-allylcyanoacetamide in the copolymer should vary between 0.4 and 2.5 mol percent. The preparation of these compounds is described in Unruh, Smith and Priest U. S. application Serial No. 518,967, filed June 29, 1955. Other copolymers described in that application such as copolymers of vinyl alcohol and cyanoacetate and copolymers of vinyl alcohol and N-methallyl-cyanoacetamide may also be employed according to our invention.

The styrene-maleic anhydride copolymer is made by copolymerizing styrene and maleic anhydride and treating the resulting polymer with ammonium hydroxide as described in Examples 1 to 3 of Godowsky U. S. Patent 2,698,794.

Azo dyes which we may use for coloring the packets include the following:

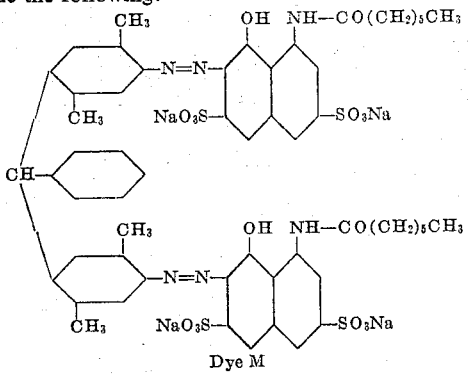

Dye M

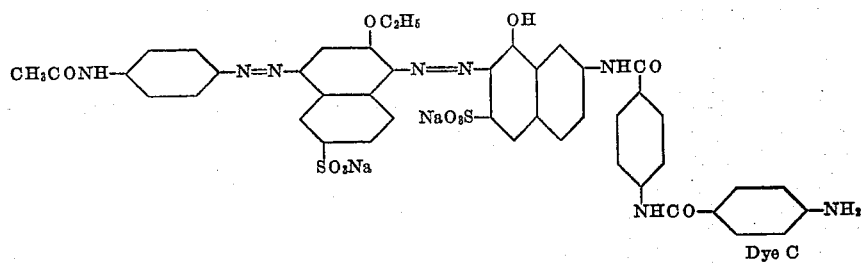

Dye C

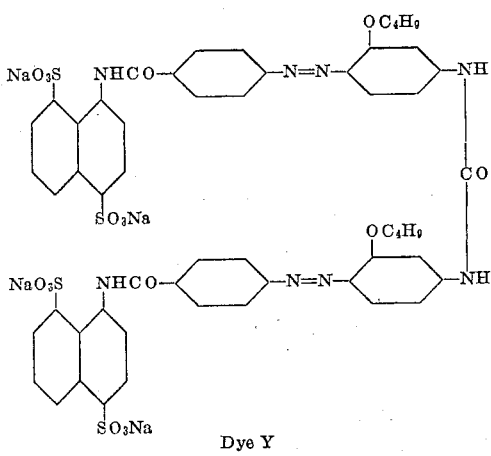

Dye Y

The packet emulsions or mixed packet emulsions of our invention are suitable for use in the dye bleach process of color photography in which the dyes incorporated in the packets are bleached, after development and fixing, with a solution which destroys the dye in the presence of metallic silver. When couplers are incorporated in the packets, the emulsions of our invention can be used for the color-forming process of color photography in which the emulsion is developed directly or after removal of the first developed silver, in a solution of a primary aromatic amino developing agent such as 2,5-diethyl-aminotoluene hydrochloride. When oil-soluble couplers are used instead of water-soluble couplers, the couplers must first be dispersed in gelatin and then added to the packet emulsion.

Oil-soluble color-forming compounds and water-soluble color-forming compounds which may be used in the packets made according to our process include those disclosed in the Wilson and Knechel U. S. application Serial No. 525,345.

The following example illustrates the method of incorporating a dye in a packet emulsion according to our invention:

Example 1

A solution of 11.56 grams of polyvinyl alcohol-N-allyl-cyanoacetamide copolymer in 100 cc. of water, 5 cc. of the solution being used, was heated to 35° C. in a water bath and stirred at a constant moderate speed by means of a mechanical stirrer. To this solution there was added 0.75 cc. of a solution of 2 grams of the magenta azo dye M in 100 cc. of water, 0.62 cc. of a 5% aqueous solution of the ammonium salt of styrene-maleic anhydride copolymer and 0.25 cc. of a solution of 15 grams of Duponol C (sodium lauryl sulfate) in 100 cc. of water. These various solutions are miscible with the polyvinyl alcohol-N-allylcyanoacetamide copolymer solution and are blended with it.

An emulsion was made by adding 22 cc. of a solution of 10 g. of phthalic anhydride gelatin, 5% phthalated, in 100 cc. of water, to 17 cc. of a green-sensitive gelatino-silver bromide emulsion and 3 cc. of water. This mixture was warmed to 35° C. and was then added a drop at a time to the resin and dye solution. The sensitive emulsion is miscible with the resin and dye solution and the resulting solution was stirred for 2 minutes. A solution of 10 grams of calcium acetate in 100 cc. of water, 0.5 cc. of the solution being used was then added with stirring. This causes the formation of spherical packets 1 to 3 microns in diameter.

A solution of 5 grams of barium nitrate in 100 cc. of water, 0.5 cc. being used, was then added to mordant the dye and prevent it from washing out in the processing solutions. The barium nitrate is not necessary for packet formation. At this point there was still found to be some dye in the external or continuous phase and 0.3 cc. of a 5.8% solution by weight of hydrochloric acid in water was added to lower the pH sufficiently so that the dye leaves the external phase and enters the packets. At this point intensely dyed magenta packets 1 to 3 microns in diameter are present.

Example 2

A dispersion of cyan packets was made as in Example 1 but using a red-sensitive gelatino-silver bromide emulsion instead of the green-sensitive emulsion and using 1.8 cc. of a solution of 0.1 g. of cyan dye C in 10 cc. of water instead of magenta dye M.

The size of the packets in each case depends on the length of time the gelatin derivative and the styrene-maleic anhydride resin have been mixed and allowed to stand before the calcium ion is added. The longer the time the mixture stands before the calcium ion is added the smaller the packets. The size of the packets may therefore be controlled in a convenient manner. No hardening agents are necessary to stabilize the packets although the addition of a dispersing agent such as Duponol C (sodium lauryl sulfate) helps to make a more uniform dispersion.

*Example 3*

The mixed packet coating was prepared by pouring 10 cc. of the dispersion made according to Example 1 into 10 cc. of the dispersion made according to Example 2 and stirring the mixture until the dispersions are thoroughly mixed. The mixed packet dispersion was then coated and dried. In mixing in this way the packets do not lump nor do the dyes wander between packets.

The coating was exposed on a sensitometer and processed as below.

The coating was bathed in the following hardening bath:

|  | Cc. |
|---|---|
| Sodium acetate (saturated) | 50 |
| Sodium sulfate (saturated) | 150 |
| Formaldehyde (35% solution) | 6 |

The hardening bath was adjusted to a pH of 10.6 with a 5% solution of sodium carbonate. After bathing in the hardening bath, the coating was dried at 135° F., washed and developed for 6 minutes at 86° F. in the following solution:

| N-methyl-p-aminophenol sulfate | grams | 7.5 |
|---|---|---|
| Sodium sulfite (desiccated) | do | 100 |
| Sodium bisulfite | do | 15 |
| Water | cc | 980 |

After a three minute water wash, the coating was bleached for 18 minutes in the following solution:

| Thiourea | grams | 360 |
|---|---|---|
| Nitric acid, conc | cc | 180 |
| Sodium m-nitrobenzene sulfonate (1% solution) | cc | 72 |
| Water | cc | 3290 |

The coating was then washed for 3 minutes in water and dried. The film showed color separation in the red and green portions of the spectrum.

The following examples illustrate the incorporation of a color-former in a packet emulsion:

*Example 4*

A coupler dispersion was made by first dissolving 250 g. of the coupler 1-(2',4',6'-trichlorophenyl)-3-[3"-(2"',4"'-di - tert. - amylphenoxyacetamido] - benzamido] - 5-pyrazolone (Loria et al. U. S. Patent 2,600,788) and 16.4 g. of di-tert. octyl hydroquinone in 750 cc. of ethyl acetate at the reflux temperature of ethyl acetate. This solution was poured into a solution of 2 kg. of 10% bone gelatin solution and 250 cc. of 5% Alkanol B (alkylnaphthalene sodium sulfonate) solution, and then milled five times in a colloid mill. Twenty-five cc. of water were used to rinse the mill. The dispersion was set up on a chill plate at 40° F., noodled and air dried at 78° F. and 50% relative humidity. Dry weight of the dispersion was 491 grams.

2.4 grams of the dry dispersion were dissolved in 15.4 cc. of water and mixed with 20 cc. of a green-sensitized gelatino-silver chlorobromide emulsion (80% chloride) to form an emulsion-coupler dispersion.

A packet dispersion was made by first heating 5 cc. of a solution of 11.56 g. of polyvinyl alcohol-N-allylcyanoacetamide copolymer in 100 cc. of water, to 43° C. in a water bath, with stirring. To this solution was added 0.25 cc. of a 15% aqueous solution of Duponol C and 3.7 cc. of the emulsion-coupler dispersion. One cc. of a 5% aqueous solution of the ammonium salt of styrene-maleic anhydride copolymer was then added and the mixture stirred for five minutes. One-half cc. of a 10% aqueous solution of calcium acetate was added with continued stirring, and this resulted in the formation of spherical packets 3 to 5 microns in diameter.

Three minutes after the calcium acetate was added, one-half cc. of a 5.8% aqueous solution of hydrochloric acid was added to stabilize the packets and keep them from swelling.

*Example 5*

A packet dispersion of a cyan coupler in a red-sensitized emulsion was made in the same way as in Example 4, using as the cyan coupler 6-{α-{4-[α-(2',4'-di-tert. amylphenoxy)butyrylamido] - phenoxy}acetamido} 2,4-dichloro-3-methylphenol (Fierke et al. U. S. application Serial No. 476,561, filed December 20, 1954). Instead of di-tert. octyl hydroquinone, 2-n-hexadecyl-5-methyl hydroquinone was used as the antistain agent, and a red-sensitized gelatino-silver chlorobromide emulsion (80% chloride) was used. Also in adding the dry coupler dispersion to the emulsion, 4.7 g. of the dispersion were used instead of 2.4 g. as in Example 4. Furthermore, the calcium acetate solution was added 7½ minutes after the mixture was stirred, instead of 5 minutes afterward as in Example 4.

*Example 6*

A packet dispersion of a yellow coupler in a blue-sensitive emulsion was made in the same way as in Example 5, using as the yellow coupler α-{3-[α-(2,4-di-tert. amylphenoxy)acetamido]-benzoyl-2-methoxyacetanilide (McCrossen et al. U. S. application Serial No. 476,159, filed December 20, 1954). A blue-sensitive gelatino-silver chlorobromide emulsion (2% chloride) was used. In making the emulsion-coupler dispersion, 1.95 g. of the dry coupler dispersion was dissolved in 26.6 cc. of water and added to 8.46 cc. of emulsion.

*Example 7*

A mixed packet coating was prepared by pouring together 10 cc. of each of the dispersions of Examples 4, 5 and 6, stirring the mixture until the dispersions were thoroughly mixed, coating and drying. The coating was exposed and processed in a 2-amino-5-diethylamine toluene HCl developer. Yellow, magenta and cyan images were produced.

It will be understood that the invention described herein is not limited to the examples and modifications referred to above but is to be taken as limited only by the scope of the appended claims.

We claim:

1. A photographic emulsion capable of producing a dye image upon photographic processing, comprising a layer of a water-permeable polyvinyl alcohol-N-allylcyanoacetamide resin having dispersed therein packets or discrete particles each containing a gelatinous material selected from the group consisting of gelatin, cyanoethylated gelatin, phenylureido gelatin and the gelatin derivatives obtained by treatment of gelatin with aromatic sulfonyl chlorides, carboxylic acid and chlorides and carboxylic acid anhydrides, silver halide and a substance capable of forming a dye image during photographic processing.

2. A photographic emulsion capable of producing a dye image upon exposure, development and bleaching, comprising a layer of a water-permeable polyvinyl alcohol-N-allylcyanoacetamide resin having dispersed therein packets or particles of a gelatin material, silver halide, styrene-maleic anhydride resin and a bleachable azo dye.

3. A photographic emulsion capable of producing a dye image upon exposure and development, comprising a layer of a water-permeable polyvinyl alcohol-N-allylcyanoacetamide resin having dispersed therein packets or particles of protein material, silver halide and a color-forming compound capable of coupling with the oxidation product of a primary aromatic amino developing agent.

4. A mixed packet photographic emulsion capable of producing a multi-color image upon exposure, development and bleaching, comprising a layer of polyvinyl alcohol-N-allylcyanoacetamide resin having dispersed therein packets or particles of gelatino-silver halide emulsion sensitive to at least one region but less than all regions of the visible spectrum and containing a bleachable azo dye, and at least one separate set of packets or particles of gelatin containing silver halide sensitive to a region of the visible spectrum different from that to which said first-mentioned silver halide is sensitive, and containing a different bleachable azo dye.

5. The method of making a packet photographic emulsion which comprises adding to a solution of polyvinyl alcohol-N-allylcyanoacetamide resin, a solution of a bleachable azo dye, a solution of styrene-maleic anhydride resin, and a silver halide emulsion containing phthalic anhydride derivative of gelatin, and thereafter adding to the mixture thus produced a solution of a water-soluble calcium salt, thereby forming packets or particles of silver halide emulsion containing styrene-maleic anhydride resin, phthalic anhydride derivative of gelatin, and bleachable azo dye, dispersed in polyvinyl alcohol-N-allylcyanoacetamide resin.

6. The method of making a packet photographic emulsion which comprises adding to a solution of polyvinyl alcohol-N-allylcyanoacetamide resin, a dispersion of a color-forming compound capable of coupling with the oxidation product of a primary aromatic amino developing agent in a gelatino-silver halide emulsion, a solution of styrene-maleic anhydride resin, and thereafter adding to the mixture thus produced a solution of a water-soluble calcium salt, thereby forming packets or particles of silver halide emulsion containing styrene-maleic anhydride resin and color-forming compound, dispersed in polyvinyl alcohol-N-allylcyanoacetamide resin.

7. The method of making a mixed packet photographic emulsion which comprises adding to a solution of polyvinyl alcohol-N-allylcyanoacetamide resin, a solution of an amino naphthol azo dye, a solution of a styrene-maleic anhydride resin and a silver halide emulsion sensitive to one region but less than all regions of the visible spectrum, said emulsion containing phthalic anhydride derivative of gelatin, and after adding to the mixture thus produced a solution of calcium acetate, thereby forming a dispersion of packets or particles of silver halide emulsion containing styrene-maleic anhydride resin, phthalic anhydride derivative of gelatin and aminonaphthol azo dye dispersed in polyvinyl alcohol-N-allylcyanoacetamide resin, similarly forming at least one other dispersion of particles of silver halide emulsion sensitive to a region of the visible spectrum different from that to which said first-mentioned silver halide is sensitive, containing styrene maleic anhydride resin, phthalic anhydride derivative of gelatin and an aminonaphthol azo dye different from said first-mentioned dye, and mixing said last-mentioned dispersion with said first-mentioned dispersion.

References Cited in the file of this patent

UNITED STATES PATENTS 2,698,796  Checkak et al. _____ Jan. 4, 1955